United States Patent
Andersson et al.

(10) Patent No.: US 7,461,782 B2
(45) Date of Patent: Dec. 9, 2008

(54) ELECTRONIC LABEL

(75) Inventors: Lars Andersson, Uppsala (SE); Björn Nilsson, Järläsa (SE); Pär Rosander, Uppsala (SE); Mikael Yttreus, Bällinge (SE)

(73) Assignee: KAI R&D Center Co., Ltd., Gifu-ken (JP)

( * ) Notice: Subject to any disclaimer, the term of this patent is extended or adjusted under 35 U.S.C. 154(b) by 442 days.

(21) Appl. No.: 10/548,513

(22) PCT Filed: Mar. 4, 2004

(86) PCT No.: PCT/SE2004/000301

§ 371 (c)(1),
(2), (4) Date: Sep. 6, 2005

(87) PCT Pub. No.: WO2004/079622

PCT Pub. Date: Sep. 16, 2004

(65) Prior Publication Data

US 2006/0273162 A1 Dec. 7, 2006

(51) Int. Cl.
*G06K 15/00* (2006.01)
(52) U.S. Cl. .................................. 235/383; 40/642.01
(58) Field of Classification Search ................ 235/375, 235/383; 40/642.02, 642.01
See application file for complete search history.

(56) References Cited

U.S. PATENT DOCUMENTS

| | | | | |
|---|---|---|---|---|
| 5,575,100 | A * | 11/1996 | Marvin et al. | 40/642.02 |
| 6,256,615 | B1 * | 7/2001 | Goodwin, III | 705/20 |
| 2004/0262470 | A1 * | 12/2004 | Lowry et al. | 248/205.1 |

* cited by examiner

*Primary Examiner*—Daniel A Hess
(74) *Attorney, Agent, or Firm*—Jones Day

(57) ABSTRACT

An electronic label showing information about a product related to this electronic label on a display (9; 31), said electronic label being updated from a central control unit. According to the invention the electronic label comprises a replaceable front shell (5; 21) and a stationary communication part (3; 23) to which the front shell should be attached.

17 Claims, 1 Drawing Sheet

ELECTRONIC LABEL

TECHNICAL FIELD OF THE INVENTION

The present invention relates to an electronic label, a front shell of said label, a communication part of said label and a method for assembling such an electronic label. The electronic label shows information about a product related to this label on a display and said electronic label is updated from a central control unit.

BACKGROUND OF THE INVENTION AND RELATED ART

An electronic shelf label system is described in for example EP 0228377.

A problem with conventionally used electronic labels is that the store environment is rather sensitive to fashion and the fashion can be changing in many ways during the life time of an electronic label. It is expensive to change all the electronic labels every time the fashion changes.

Another problem is that different systems for electronic labels are used in different markets and in different parts of the world. The provider of the electronic labels has to adapt the electronic labels to the different markets.

A further problem is that the outer shell of the electronic labels becomes dirty and sun-bleached before the electronic itself has reached its life time.

SUMMARY

An object of the invention is to provide an electronic label that is easy to adapt to different fashions and to different markets.

This is achieved in an electronic label according to claim 1.

Hereby an electronic label is provided comprising a front shell that is easy to change. Therefore the electronic label can in an easy and cheap way be adapted to different markets and fashions. Preferably one or more of the functions normally performed in an electronic label is performed in the shell and hereby the stationary communication part can be kept simpler and more uniform throughout different markets.

Suitably the front shell is active and interacts with the communication part.

Preferably the front shell has a different geometrical shape than the communication part. Hereby the shape of the electronic label is changed when the front shell is attached.

In one embodiment the front shell comprises an area through which at least a part of a display comprised in the communication part of the electronic label can be seen.

Possibly the front shell comprises a text line showing the name of the product related to the electronic label. Hereby the stationary communication part of the electronic label need not to be marked with a certain product's name and can easily be used for different products.

In one embodiment the front shell comprises an identity and the communication part comprises means for reading said identity when the front shell is attached to the communication part, said identity hereby identifies the electronic label and is used in the linking process to products. Hereby each stationary communication part need not to have an own identity from the beginning and the manufacturing of the communication parts is thus simplified.

The front shell comprises in one embodiment a display and means for connecting the display to a display driver in the communication part when the front shell is attached to the communication part, said communication part further comprising a communication interface that forwards updated information received from the central control unit through a controller in the communication part and through the display driver to the display in the front shell.

In another embodiment the front shell comprises a display and a display driver and means for connecting the display driver to a controller in the communication part when the front shell is attached to the communication part. The front shell could also comprise a display, a display driver, a controller and means for connecting the controller to a communication interface comprised in the communication part when the front shell is attached to the communication part.

An advantage with having the display in the front shell is that the display can be adapted to the design of the front shell and that it can have a different size compared to the communication unit. The communication unit can be made much smaller and easier to produce and hence cheaper and it can be adapted to any size of front shell including display.

Suitably the front shell comprises a power source giving power to the whole or a part of the electronic label when the front shell is attached to the communication part. Hereby no power source is needed in the communication part. When the power source has run down the whole front shell can be changed. The front shell is according to the invention easy to replace. Otherwise only the power source in the front shell could be changed.

Preferably the front shell comprises a memory comprising parameters describing how the information is to be presented on the display and the electronic label comprises means for reading said memory and means for adapting the information shown on the display accordingly. Hereby the displayed information can be adapted to different fashions and different markets easily.

Suitably the front shell comprises an attention getter, for example in the form of a flashing light or a separate display and means for connecting said attention getter to a controller in the electronic label such that the activity of the attention getter can be correlated with the information shown on the display.

Preferably the front shell comprises fittings adapted to fit into existing shelf edge profiles or existing fruit and vegetable profiles. Hereby the front shell is easy to attach. Furthermore, in one embodiment the communication part is adapted to be attached to only the front shell which in turn is adapted to be attached to for example the shelf edge profiles. Hereby the communication parts need not to be adapted to different kinds of shelf edge profiles and other profiles and the communication parts can be more uniformly produced for all different markets.

In one embodiment of the invention the front shell is adapted to be attached to more than one communication part.

DETAILED DESCRIPTION OF THE EMBODIMENTS

Figure 1:
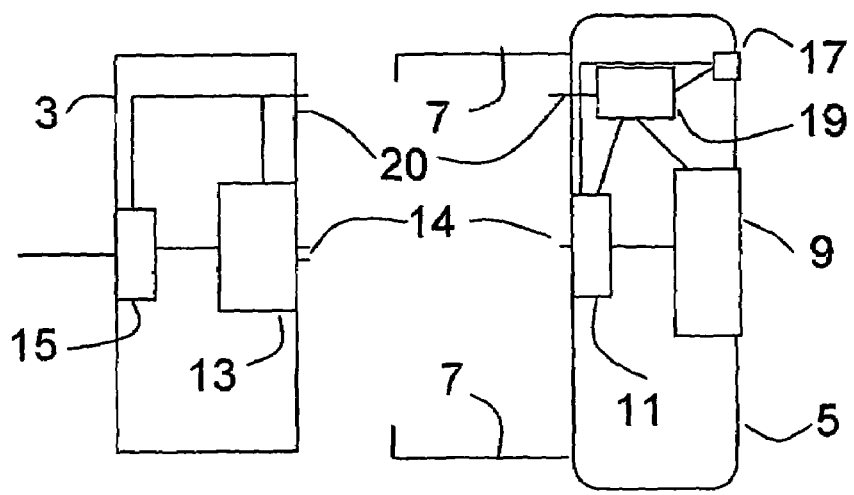
FIG. 1 is a schematic view of a first embodiment of an electronic label according to the invention.

According to the invention an electronic label comprising a replaceable front shell should be provided. The front shell is adapted to be attached to a communication part of the electronic label. The shell can be flat or have a rounded shape, a shape looking like a specific product or like a company logo. In one embodiment of the invention the front shell is made with a hole such that a display of the electronic label that in this embodiment is comprised in the communication part of the electronic label can be seen through the hole. The hole can be over the whole display or it could have an arbitrary shape giving the illusion that the display is not square shaped as most common displays are. If the shell has a hole for exposing the display the communication part preferably have a transparent cover over the display, at least if the display is sensitive for pressure, scratches or moisture. Otherwise the front shell can be transparent over the display such that the display can be seen through the front shell.

In another embodiment of the invention the front shell comprises a display which is adapted to be connected to a display driver in the communication part when the front shell is attached to the communication part. The front shell could also comprise both the display and the display driver. The display driver is then adapted to be connected to a controller in the communication part when the front shell is attached to the communication part. The controller could possibly also be comprised in the front shell. The controller is then adapted to be connected to a communication interface in the communication part for receiving the updated information that should be shown on the display from a central control unit connected to the communication part of the electronic label. Typically in a store many electronic labels are connected to one central control unit from which the electronic labels receive updated information regarding for example prices of the products related to each label. The relation between different labels and different products is called linking and is stored in a database connected to the central control unit.

A display in this description can be any kind of display, preferably a bistable type of display. Displays can for example be of types LCD, OLED (Organic Light Emitting Diode), E-paper (Electronic ink) like for example EPD (electrophoretic display), cholosteric display, ferroelectric display or bistable neumatic display.

The front shell can be mounted to the communication part of the electronic label in a variety of manners including:

Hooks on one piece and corresponding holes in the other and mechanics made in such material and form such that it is possible to bend one part a bit so that the hook is clicking in the hole when the shell is in place on the communication part of the electronic label. The hooks can be made of any material like plastic and metallic materials. Preferably the hook is made out of moulded plastic as part of either the communication part or the shell.

Resilient grippers attached to the front shell and adapted to grip around the communication part.

A connection part that is a third part in the electronic label system and were the communication part and the shell is adapted to be kept together by this third part. The connection part can be made of any material like plastic and metallic materials. Preferably the connection part is made out of moulded plastic as part of either the communication part or the front shell or of steel spring materials.

Electronic label rail is holding both the communication part and the front shell separately. The electronic label rail is the part that is mounted on the shelf edge and adapted to hold the electronic label to the shelf edge or to any other position were the electronic label is intended to be mounted. In this embodiment of the invention the rail comprises attaching means for both the communication part and the front shell.

Rail adapted to hold the shell which in turn holds the communication part, see detailed description below.

Glue or tape connection.

Magnet connection.

According to the invention the front shell could also comprise one or more of the functions normally comprised in an electronic label. The front shell is hereby preferably active and interacts with the communication part. These functions or features could be for example a display as discussed above, a memory, a product description, a power source, an attention getter or a temperature sensor. The different possible functions and features are discussed in more detail below. They can be provided in the front shell separately or in combination.

In one embodiment of the invention the front shell comprises a memory, for example a RFID (Radio Frequency Identification) chip, from which the communication part of the electronic label can retrieve information when the front shell is attached to the communication part. The information retrieved could be for example information of frequency of flash periods for a part of an LCD that is flashing (a type of attention getter) or it could be layout that is describing how incoming text strings or other data is to be presented on the display. Colour information could also be included. Hereby the electronic label can be adapted for different markets and different fashions by adapting parameters provided in a memory in the front shell.

The information retrieved from the memory could also be an identity, an ID, of the shell that is transferred to the communication part when the shell is attached. Hereby each communication part needs not to have a unique ID but it can read the ID from a front shell that is attached. Hereby the ID of the front shell will provide the identity to the whole electronic label and the production of the communication parts is simplified since no unique identity is needed for them. The communication part comprises thus means to be able to read the identity from the front shell. Furthermore the communication part of the electronic label has means for detecting that a new identity has been read, i.e. that the front shell has been replaced by a new front shell. In one embodiment of the invention the communication part of the electronic label has a RFID receiver for reading the ID of the shell.

The front shell could furthermore comprise a power source, for instance a battery, a fuel cell, a solar cell or a combination of different power sources. When the front shell is attached to the communication part of the electronic label the power source should in one embodiment of the invention be connected to the communication part and provide the whole electronic label with power. Hereby it is easy to change the power source when for example the battery has run down. The front shell is easy to release and the power source could be changed or a new front shell with a fresh power source could be used.

The front shell can furthermore comprise an attention getter and possibly also a separate power source for this attention getter since an attention getter possibly needs more power than the rest of the electronic label. Herby the power source can be changed for only the attention getter. The attention getter could be for example a LED, an electro lumiscent film, LCD, OLED (Organic Light Emitting Diode), E-paper (Electronic ink) like for example EPD (electrophoretic display), cholosteric display, ferroelectric display or bistable neumatic display. The attention getter function is either to flash light or to flash or static show at least a part of a display. The front shell in this embodiment also needs means for sensing if the electronic label is activated in order to coordinate the activation of the attention getter. The attention getter could be connected to a controller in the electronic label such that the controller can control the attention getter and coordinate the activity of the attention getter with the information shown on the display.

The front shell can also include a temperature sensor and means for communication the temperature to the communication part of the electronic label.

The front shell can also in one embodiment comprise buttons for a user to press. A communication part according to this embodiment needs thus means for sensing when the buttons in the front shell are pressed. Functionality that could be controlled by pressing the buttons could be for example to change information on the display.

Electronic label in this description shall be interpreted both as electronic shelf label, ESL, intended for the shelf edge but also as an electronic information displaying device that could be mounted for example in the fruit and vegetable area or as free standing displays.

All over the world there are many different variants of how an electronic label is mounted in an electronic label rail on the shelf edge or in another holder device used for example for the fruit and vegetables.

In one embodiment of the invention the front shell includes the needed details to fit into a specific rail or a specific holder device and the communication part of the electronic label is then just fitted onto the front shell and need not to be adapted for the different kinds of rails and holder devices. Hereby the communication parts of the electronic labels can be designed to fit all different types of rails and holder devices. Only the front shells need to be adapted for different markets.

Shelf talkers are in some countries used as complements to the ESL. ESL talker is usually a small paper or plastic static display with very attracting text and layout like for example large red text SAVE to indicate an item that is on sale right now. The front shell according to the invention can also contain fittings for existing or new shelf talkers.

The front shell can in one embodiment of the invention be adapted to be attached to more than one communication part of electronic labels. One front shell could then be common for two, three or even more electronic labels. In this way several electronic labels showing similar products can be gathered onto the same shell to give the impression that these products are alike.

In one embodiment of the invention the product description is printed directly on the front shell. Hereby no product description paper label is needed. Today the electronic labels are often provided with stickers showing the names of products which stickers then can be changed for other stickers showing other product names. With the product description printed on the front shell no stickers need to be provided on the communication part of the electronic label. Either the product description is printed directly on the front shell and the whole front shell is replaced when a product is changed or otherwise stickers can be used on the front shells and the stickers can be changed as before. It is an advantage that no product description needs to be provided on the communication part of the electronic label. Hereby the communication parts of the electronic labels can be kept intact and need not to be adapted for different products and changes in the store.

In another embodiment the product description is provided on the communication part of the electronic label and then the front shell need to have a hole over the description or the shell could be clear plastic above the product description. An advantage with this embodiment is that it is easier to keep the label clean when the description part is covered by the front shell.

The front shell can be of a shape that is non flat. A rounded shape is of many regarded as more attractive. The shell can have a rounded outline as well as a surface that is non flat. The surface can be of any shape including shape of a product, like for instance a special kind of bottle or a mobile phone or just about any shape. Also when more than one electronic label is to be mounted in one shell this gives room for a lot of creativity when designing the shell in three dimensions.

In one preferred embodiment all functions that are customer special demands are provided in the front shell. Hereby the communication part of the electronic label can be made exactly the same for all different customers. Customer special demands could be for example the shape of the front shell, the fittings to the rail or holders, information stored in a memory in the front shell regarding for example layout and colours for the displayed information, etc.

A side view of a first embodiment of the invention is schematically shown in FIG. 1. An electronic label 1 is shown comprising a communication part 3 and a front shell 5. The front shell 5 comprises resilient grippers 7 that are adapted to hold the front shell 5 in place when it has been attached to the communication part 3. They grip around the communication part 3. However as described above there are many different possibilities to attach the front shell 5 to the communication part 3.

The front shell 5 comprises further a display 9 on which information about the product related to this electronic label should be shown. The display 9 is connected to a display driver 11 also comprised in the front shell 5. When the front shell 5 is attached to the communication part 3 the display driver is connected to a controller 13 in the communication part 3. The connectors are shown schematically as number 14. The communication part 3 comprises further a communication interface 15 to which the controller 13 is connected. The communication interface 15 is further connected wirelessly to a central control unit from where information updates is received as discussed above. Wireless communication can be of type Infrared (IR), Radio, acoustic or any other means.

The front shell 5 comprises furthermore in this embodiment an attention getter 17. An attention getter is for example a flashing lamp that should draw attention to this specific label. The attention getter 17 is connected to a power source 19 also comprised in the front shell 5. The power source 19 provides power to the attention getter 17, the display 9 and to the display driver 11. The communication part 3 also gets power from the power source 19 in the front shell 5 when the front shell 5 is attached to the communication part 3. This is shown schematically by connectors 20. Hereby the communication part 3 need not to have an own power source.

The attention getter 17 is also connected to the display driver 11 and therefore to the controller 13 when the two parts are attached. The reason is that the activity of the attention getter 17 needs to be correlated with the information shown on the display and maybe with instructions from the central control unit. In another embodiment the attention getter is connected directly to the controller when the front shell is attached to the communication part. The attention getter can comprise an own driver or a simple on-off controller and be controlled from the controller 13 in accordance with information shown on the display.

Figure 2A:
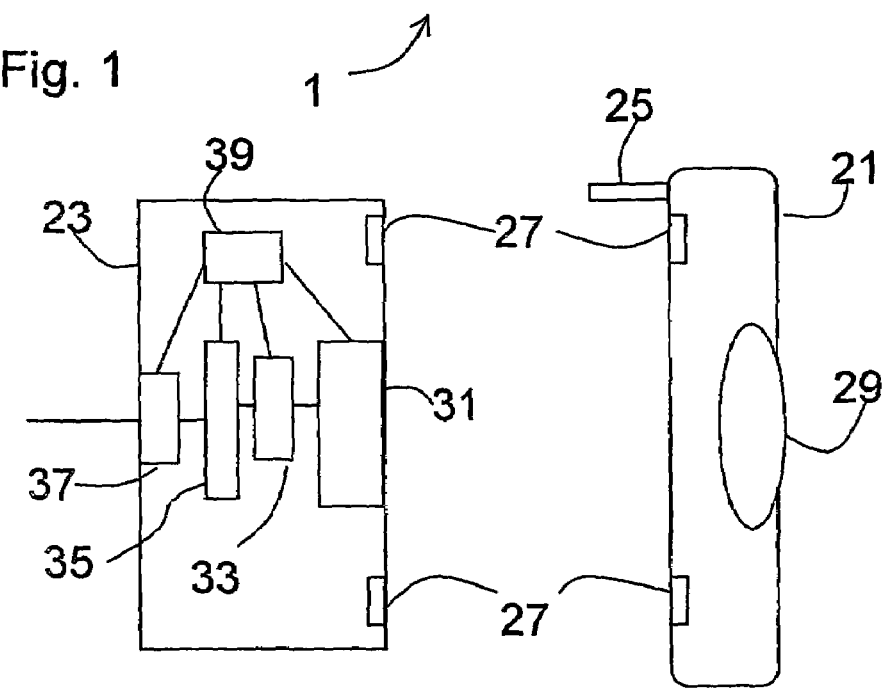
FIG. 2*a* is a schematic view of a second embodiment of an electronic label according to the invention.

FIG. 2a shows schematically a side view of a second embodiment of a front shell 21 and a communication part 23 according to the invention. The front shell 21 comprises a support 25 and magnets 27 as means for attaching the front shell 21 to the communication part 23. The communication part 23 comprises thus also magnets 27. The front shell 21 comprises also a hole 29 (schematically shown) covered with a transparent plastic adapted to cover a display 31 comprised in the communication part 23 when the front shell 21 is attached to the communication part 23. The hole 29 is provided such that the display 31 can be seen through the plastic cover. The communication part 23 comprises all the necessary functions for an electronic label. A display 31, a display driver 33 connected to the display 31, a controller 35 connected to the display driver 33 and a communication interface 37 connected to the controller 35 and adapted to communication with a central control unit as described above. A power source 39 connected to all the other parts is also provided in the communication part 23.

Figure 2B:
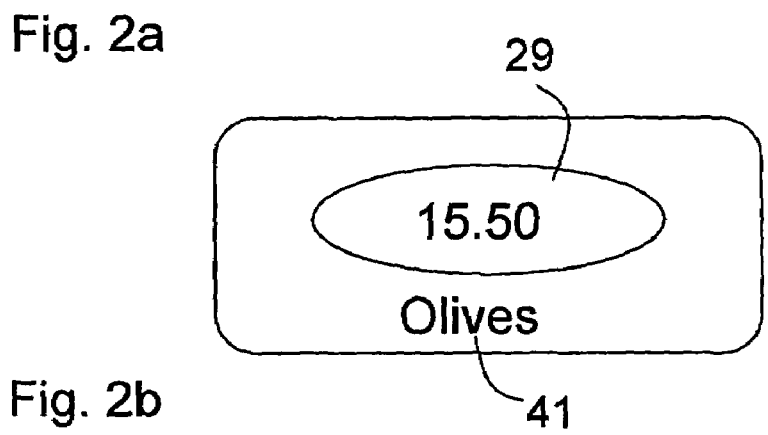
FIG. 2*b* shows the front shell of the second embodiment from the front side.

FIG. 2b shows the electronic label in FIG. 2a from the front side. Through the hole 29 the display can be seen. Here the price of the product is shown on the display. Under the hole 29 a product description 41 is provided on the front shell.

The invention claimed is:

1. An electronic label showing information about a product related to this electronic label on a display, said electronic label being updated from a central control unit, wherein it comprises a replaceable front shell and a stationary communication part to which the front shell is attached, wherein the front shell is active and interacts with the communication part.

2. An electronic label according to claim 1, wherein the front shell has a different geometrical shape than the communication part.

3. An electronic label according to claim 1, wherein the front shell comprises an area through which at least a part of a display in the communication part of the electronic label can be seen.

4. An electronic label according to claim 1, wherein the front shell comprises a text line showing the name of the product related to the electronic label.

5. An electronic label according to claim 1, wherein the front shell comprises an identity and the communication part comprises means for reading said identity when the front shell is attached to the communication part, said identity hereby identifies the electronic label and is used in the linking process to products.

6. An electronic label according to claim 1, wherein the front shell comprises a display and means for connecting the display to a display driver in the communication part when the front shell is attached to the communication part, said communication part further comprising a communication interface that forwards updated information received from the central control unit through a controller in the communication part and through the display driver to the display in the front shell.

7. An electronic label according to claim 1, wherein the front shell comprises a display and a display driver and means for connecting the display driver to a controller in the communication part when the front shell is attached to the communication part, said communication part further comprising a communication interface that forwards updated information received from the central control unit through the controller and the display driver to the display in the front shell.

8. An electronic label according to claim 1, wherein the front shell comprises a display, a display driver, a controller and means for connecting the controller to a communication interface comprised in the communication part when the front shell is attached to the communication part, said communication interface forwarding updated information received from the central control unit through the controller and the display driver to the display in the front shell.

9. An electronic label according to claim 1, wherein the front shell comprises a power source providing power to the whole or a part of the electronic label when the front shell is attached to the communication part.

10. An electronic label according to claim 1, wherein the front shell comprises a memory comprising parameters describing how the information is to be presented on the display and the electronic label comprises means for reading said memory and means for adapting the information shown on the display accordingly.

11. An electronic label according to claim 1, wherein the front shell comprises an attention getter and means for connecting said attention getter to a controller in the electronic label such that the activity of the attention getter can be correlated with the information shown on the display.

12. An electronic label according to claim 1, wherein the front shell comprises fittings adapted to fit into existing shelf edge profiles.

13. The front shell for the electronic label according to claim 1.

14. A front shell according to claim 13, wherein the front shell is adapted to be attached to more than one communication part.

15. A communication part for the electronic label according to claim 1.

16. An electronic label system comprising at least one central control unit to which a plurality of electronic labels are wirelessly connected, said electronic labels showing information about products and being updated from the central control unit, wherein it comprises at least one electronic label showing information about a product related to the at least one electronic label on a display, said at least one electronic label being updated from a central control unit, wherein it comprises a replaceable front shell and a stationary communication part to which the front shell is attached, wherein the front shell is active and interacts with the communication part.

17. A method for providing an electronic label showing information about a product related to the electronic label on a display, said electronic label being updated from a central control unit, the method comprising the step of combining a communication part and a front shell, said communication part comprising a communication interface for communication with the central control unit, the front shell and the communication part when assembled together forming the electronic label, wherein the front shell is active and interacts with the communication part.

* * * * *

UNITED STATES PATENT AND TRADEMARK OFFICE
CERTIFICATE OF CORRECTION

PATENT NO. : 7,461,782 B2
APPLICATION NO. : 10/548513
DATED : December 9, 2008
INVENTOR(S) : Lars Andersson et al.

It is certified that error appears in the above-identified patent and that said Letters Patent is hereby corrected as shown below:

On the front page, please correct the Assignee section to read as follows:

--PRICER AB--

Signed and Sealed this

Thirteenth Day of April, 2010

David J. Kappos
*Director of the United States Patent and Trademark Office*